No. 854,591. PATENTED MAY 21, 1907.
J. H. McENTIRE.
BEAN HARVESTER.
APPLICATION FILED MAR. 24, 1906.
3 SHEETS—SHEET 1.
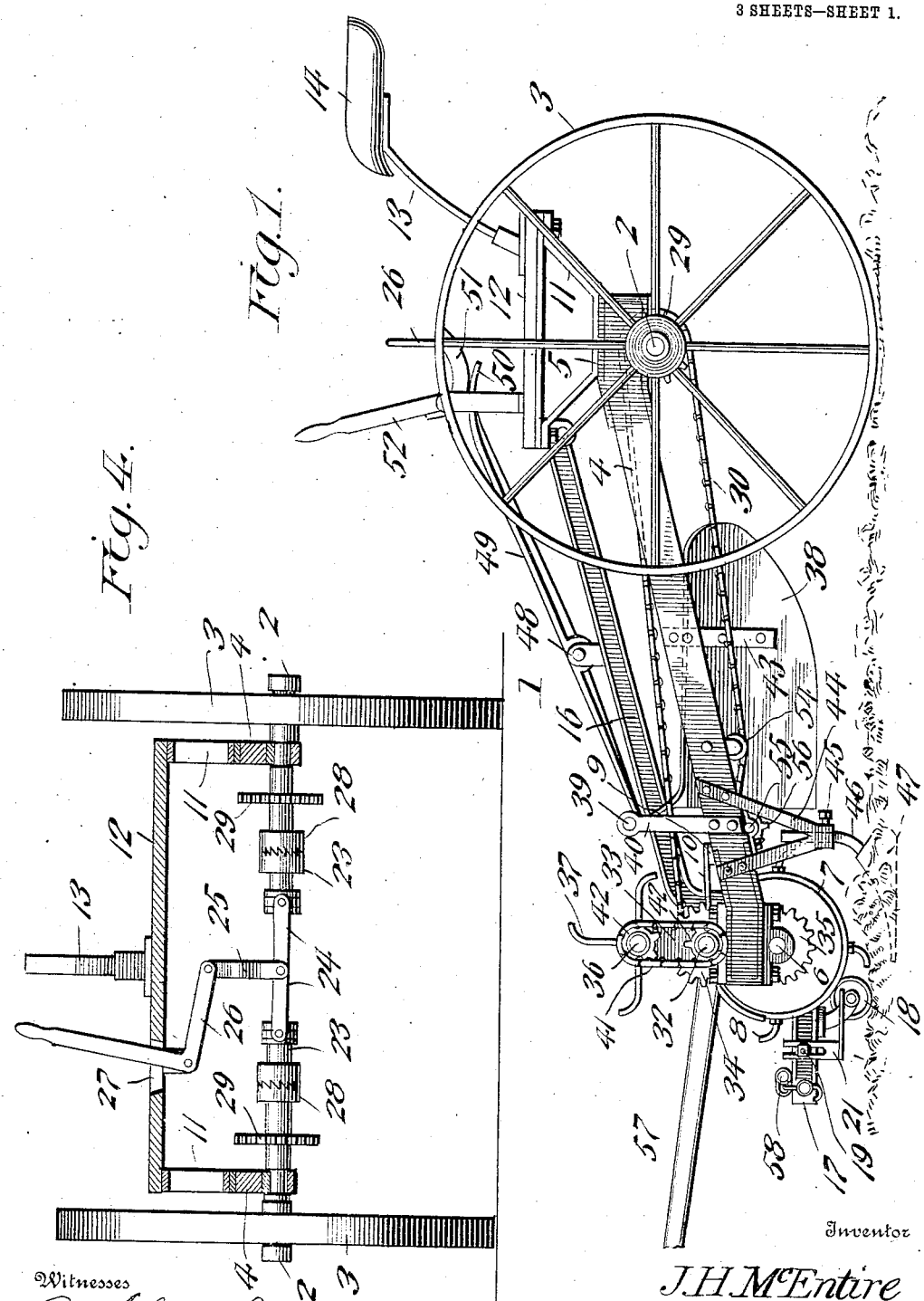
Witnesses
Geo. Ackman Jr.
F. S. Elmore
Inventor
J. H. McEntire
By Victor J. Evans
Attorney No. 854,591. PATENTED MAY 21, 1907.
J. H. McENTIRE.
BEAN HARVESTER.
APPLICATION FILED MAR. 24, 1906.
3 SHEETS—SHEET 2.
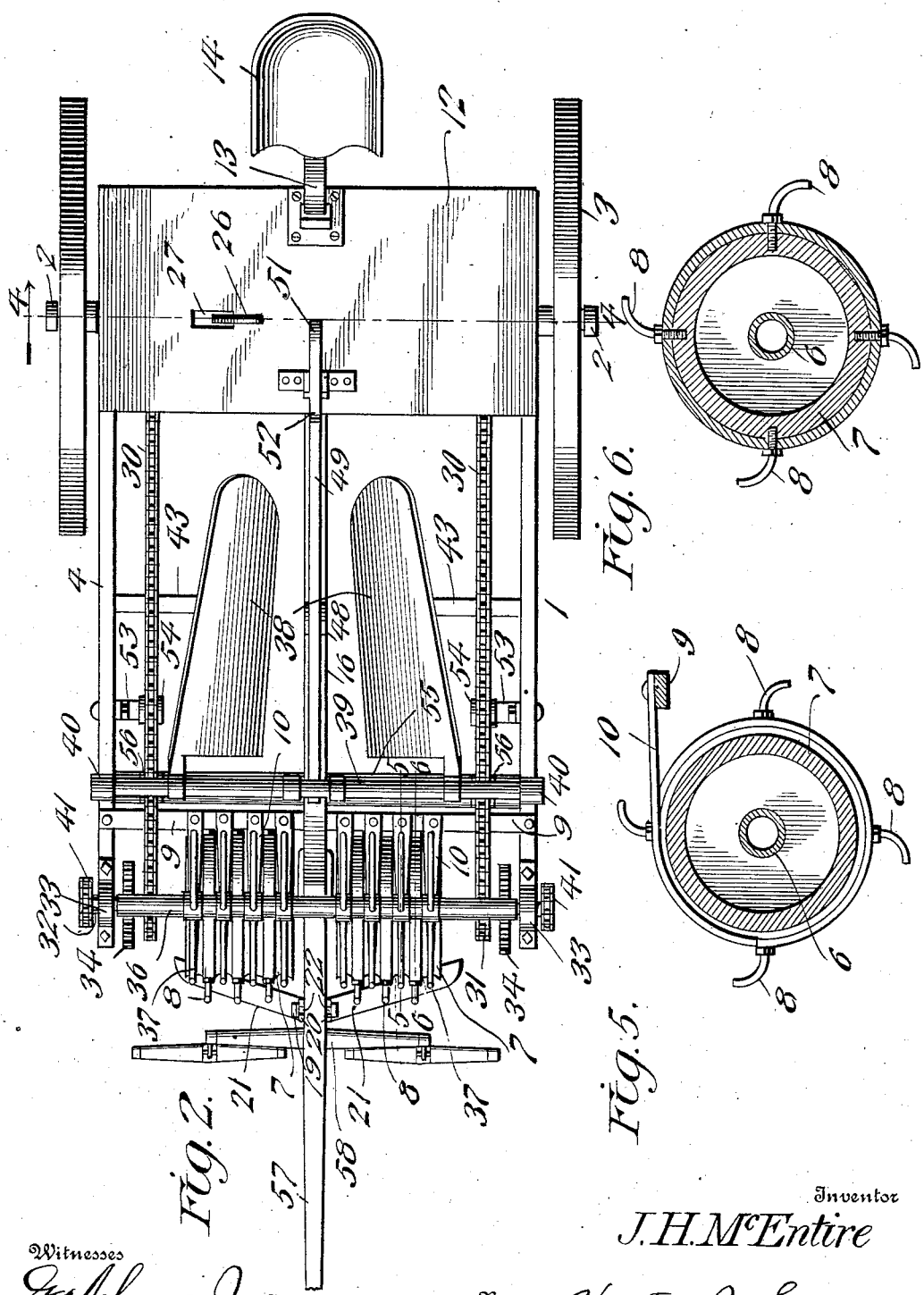

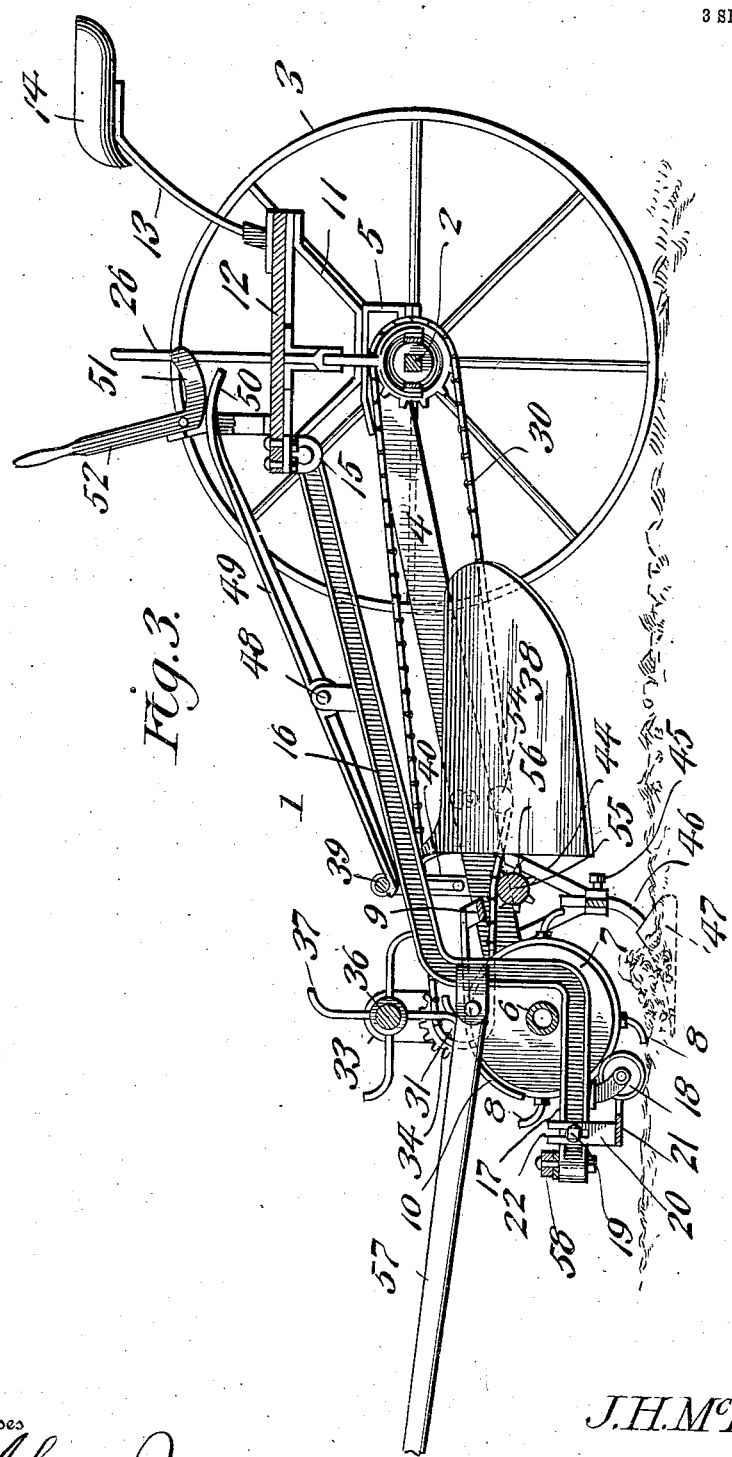

UNITED STATES PATENT OFFICE.

JAMES H. McENTIRE, OF WILLIAMSTON, MICHIGAN.

BEAN-HARVESTER.

No. 854,591.  Specification of Letters Patent.  Patented May 21, 1907.

Application filed March 24, 1906. Serial No. 307,906.

*To all whom it may concern:*

Be it known that I, JAMES H. McENTIRE, a citizen of the United States, residing at Williamston, in the county of Ingham and State of Michigan, have invented new and useful Improvements in Bean-Harvesters, of which the following is a specification.

This invention relates to bean harvesters of the type which gather the vines from a plurality of rows and direct them into a single row, and has for its objects to provide a comparatively simple, inexpensive device of this character in which the vines will be lifted for proper engagement with the harvesting drum, one in which the vines will be delivered rearwardly from the drum between the deflecting members or shields and directed by the latter into the row, and one in which the vines will be positively freed from the drum teeth during the harvesting operation.

A further object of the invention is to provide a device of this character in which the harvesting mechanism may be raised clear of the ground to permit turning of the machine, one wherein the lifting lever will exert a direct lifting power upon said mechanism, and one wherein the lifting lever may be conveniently operated and this with the expenditure of a minimum amount of energy.

With these and other objects in view, the invention comprises the novel features of construction and combination of parts more fully hereinafter described.

In the accompanying drawings: Figure 1 is a side elevation of a harvesting machine embodying the invention. Fig. 2 is a top plan view of the same. Fig. 3 is a vertical, longitudinal section centrally through the machine embodying the invention. Fig. 4 is a vertical, transverse section taken on the line 4—4 of Fig. 2 and viewed in the direction of the arrow. Fig. 5 is a detail sectional view of the drum, the section being taken on the line 5—5 of Fig. 2. Fig. 6 is a detail section of the drum taken on the line 6—6 of Fig. 2.

Referring to the drawings, it will be seen that the frame 1 of the machine includes an axle 2 equipped with transporting wheels 3 and a pair of forwardly and downwardly inclined side bars 4, the rear ends of which are fixed in boxes or castings 5 in which the axle 2 is journaled, there being journaled in the forward ends of the bars 4 a drum shaft 6 carrying a pair of harvesting drums 7 disposed respectively on opposite sides of the transverse center of the machine and each having a plurality of rows of forwardly curved engaging teeth 8, while extended between and terminally attached to the bars 4 at a point immediately in rear of the drums is a cross piece or bar 9 carrying a plurality of forwardly projecting guide members or fingers 10 arranged respectively between the rows of teeth 8 and curved at their forward ends to conform to the curvature of the drum 7.

Sustained above the axle 2 by means of supporting members or brackets 11 attached to the castings 5 is a platform 12 from which arises a standard 13 carrying a seat 14, while pivoted beneath the forward edge of the platform between bearing ears 15 is the rear end of a central longitudinally extending frame member or bar 16 preferably of the form shown and having a forward horizontal extension 17 lying beneath the drum shaft 6 and carrying a vertically pivoted caster wheel 18, there being connected to the forward portion 17 of the bar by means of a transverse bolt 19 a pair of vertically adjustable knife carrying members or blocks 20 equipped with cutting blades 21 and having slots 22 to receive the bolt 19, whereby the blades may be adjusted to vary their height relative to the ground surface.

Slidably disposed upon the axle 2 and suitably fixed for rotation therewith is a pair of clutch members or heads 23 connected by links 24 in turn connected by means of a link 25 with an operating lever 26 extended upward through an opening 27 in the platform 12 and within convenient reach from the seat 14, the clutches 23 being designed for engagement with companion clutches 28 formed upon the hubs of sprocket wheels 29 arranged idly on the axle and connected by chain belts 30 with sprocket gears 31 fixed upon stub shafts 32 journaled in suitable bearings 33 at the forward end of the frame 1, there being also fixed upon the shafts 32 gears 34 in mesh with gears 35 fixed upon the shaft 6 for driving the same. It will be noted in this connection that when the machine advances over the ground the axle 2 will be rotated and will through the medium of the sprocket and chain connections impart motion to the stub shafts 32 from which the drum shaft 6 is in turn driven through the medium of the gears 34, 35, it being understood that the drum operating mechanism may be thrown out of action at will by operating the lever 26 for throwing the clutches 23 out of engagement with the clutches 28.

Terminally journaled in the bearings 33 and arranged vertically above the shafts 32 is a feeder shaft 36 equipped with radiating feeder members or arms 37 adapted to act upon the material collected by the drum 7 for feeding the same over the fingers 10 rearwardly between a pair of downwardly and inwardly inclined deflecting members or blades 38 adjustably mounted at their forward ends upon a transverse rod 39 extended across the frame 1 and having bearing at its ends in vertical bearing members or standards 40 in turn bolted at their lower ends to the bars 4. The shaft 36 is connected to be driven from the stub shafts 32 by means of sprocket chains 41 arranged for travel around sprocket pinions 42 fixed respectively upon the shafts 32, 36, while the deflector blades 38 which serve to direct the vines or other material into a single row are further sustained by supporting straps 43 bolted thereto and to the bars 4.

Bolted to the forward ends of the bars 4 are vertical bearings 44 in each of which there is connected for vertical adjustment and by means of a set screw 45 the shank or standard 46 of one of a pair of plows 47 which serve to lift the vines to position for ready engagement by the teeth 8, while centrally pivoted to the bar 16, as at 48, is a lifting lever 49 engaged at its forward end with the rod 39 and provided at its rear end with a curved cam portion 50 to be acted upon by the curved cam portion or arm 51 of an operating lever 52 journaled in suitable bearings on the platform 12 within reach of the seat 14 and adapted to be operated for moving the rear end of the lever 49 downward and thus cause its forward end to lift the forward ends of the frame bars 4 together with the drum 7 and plows 47 to permit of the machine being freely turned.

Attached to the bars 4 are brackets 53 carrying rollers 54 which act upon and for tensioning the belts 30, there being terminally journaled in bearings on the bars 4 and at a point immediately in rear of the bar 9 a roller 55 driven from the chains 30 by means of sprockets 56 and adapted to advance the material from the fingers 10 to position between the blades 38, while attached at its rear end to the bar 16 is a tongue or pole 57, and to the forward end of the horizontal portion 17 of said bar a double tree 58.

In practice, as the machine advances over the ground, the vines to be harvested will be lifted by the plows 47 and engaged by the teeth 8 during the rotation of the drum 7 and carried upward by the latter for delivery rearwardly over the fingers 10 and roller 55 to the blades 38 by which the vines gathered from a plurality of rows will be deposited in a single row. As the material passes onto the fingers 10 it will be disengaged from the teeth 8 by means of the feeder arms 37, the shaft 36 of which is operated from the stub shafts 32 in the manner heretofore explained. While the vines are being gathered the blades 21 serve to cut the weeds and direct them outward toward and beyond the ends of the drums 7. During operation of the machine the harvesting mechanism may be thrown out of operation at will by means of the lever 26, or may be lifted by means of the levers 52 and 49 to permit free turning of the machine at the ends of the rows, as heretofore explained.

From the foregoing it is apparent that I produce a simple device admirably adapted for the attainment of the ends in view, it being understood that in attaining these ends minor changes in the details herein set forth may be resorted to without departing from the spirit of the invention.

Having thus described my invention, what I claim is;

1. In a bean harvester, a frame, a harvesting drum journaled for rotation therein and provided with vine engaging teeth, a pair of rearwardly converging deflector blades sustained in rear of the drum, a finger bar fixed in the frame at a point between the drum and blade, forwardly projecting guide fingers carried by the bar and adapted to extend partially around the drum between the teeth, and means for feeding the material over the fingers rearwardly between the deflecting blades.

2. In a bean harvester, a frame, a harvesting drum journaled at the forward end thereof and provided with vine engaging teeth, a pair of rearwardly converging deflector blades sustained in rear of the drum, a finger bar fixed in the frame between the blades and drum, forwardly projecting guide fingers carried by the bar and arranged to overlie the drum between the teeth, a rotary feeder shaft sustained above the drum and equipped with feeder arms adapted to free the material from the teeth and direct the same rearwardly over the fingers for delivery between the blades, and means for operating the feeder shaft and drum.

3. In a bean harvester, a frame including an axle equipped with transporting wheels, a rotary harvesting drum journaled at the forward end of the frame and provided with vine engaging teeth, a pair of rearwardly converging deflector blades sustained in rear of the drum, a series of guide fingers fixed on the frame between the blades and drum and arranged to project forwardly over the latter between the teeth and having arms adapted to free the material from the teeth and direct the same rearwardly over the fingers for delivery between the blades, operative connections between the drum and feeder shaft for driving one of said parts from the other, and operative connections between one of the parts and the axle for operating the drum and shaft.

4. In a bean harvester, a frame including an axle equipped with transporting wheels, a rotary harvesting drum journaled at the forward end of the frame and provided with vine engaging teeth, plow blades connected with the frame in rear of the drum for lifting the vines into the path of the teeth, a pair of rearwardly converging deflector blades sustained in rear of the drum, a series of guide fingers mounted in the frame between the blades and drum and arranged to project forwardly over the latter between the teeth, a rotary feeder shaft sustained above the drum and having arms designed to free the material from the teeth and feed the same rearwardly over the fingers for delivery between the blades, and operative connections between the axle and drum and shaft for operating said parts.

5. In a bean harvester, a frame including an axle equipped with transporting wheels, a pair of longitudinal frame bars pivotally connected at their rear ends with the axle and adapted to swing in a vertical plane, a drum journaled for rotation at the forward end of said bars and provided with vine engaging teeth, a pair of downwardly and rearwardly converging deflector blades sustained by the bars in rear of the drum, means for feeding material from the drum rearwardly between the blades, a lifting lever pivoted between its ends on the frame and having its forward end operatively connected with the frame bars, and an operating lever fulcrumed on the frame and having a cam arm arranged to act on the rear end of the lifting lever for actuating the latter to lift the bars and the parts of the mechanism carried thereby.

6. In a bean harvester, an axle equipped with transporting wheels, a platform sustained above the axle, a vertically movable frame including longitudinal bars pivotally connected at their rear ends with the axle, a central frame bar attached at its rear end to the platform and provided at its forward end with a caster wheel, a rotary harvesting drum journaled at the forward end of the vertically movable frame and provided with vine engaging teeth, a pair of downwardly and rearwardly converging deflector blades sustained by the frame in rear of the drum, a series of guide fingers sustained on the frame between the blades and drum and adapted to project forwardly over the latter, a rotary feeder shaft sustained above the drum and having arms adapted to free the material from the teeth and feed the same rearwardly over the fingers for delivery between the blades, operative connections between the feeder shaft and drum and for driving said parts one from the other, operative connections between the axle and drum for driving the latter, a lifting lever fulcrumed between its ends on the central frame bar and connected at its forward end with the vertically movable frame, and an operating lever having a portion arranged to act on the rear end of the lifting lever for actuating the same to lift the frame and the parts carried thereby.

In testimony whereof, I affix my signature in presence of two witnesses.

JAMES H. McENTIRE.

Witnesses:
   CLYDE V. KING,
   CLAIRE R. HIGBEE.